UNITED STATES PATENT OFFICE.

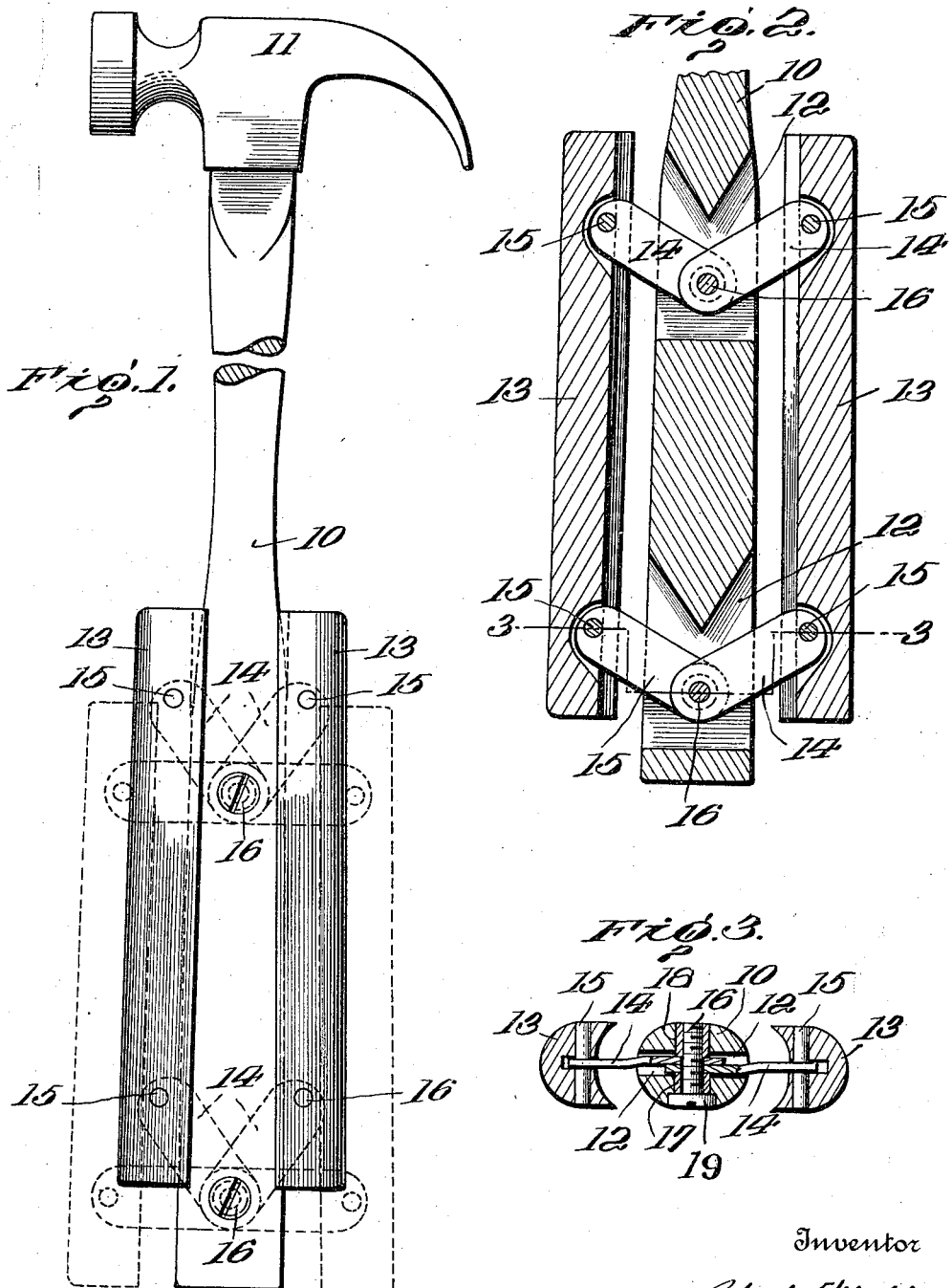

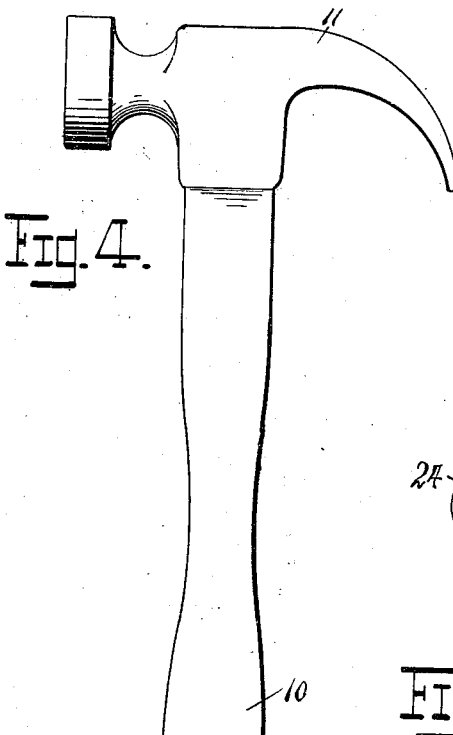
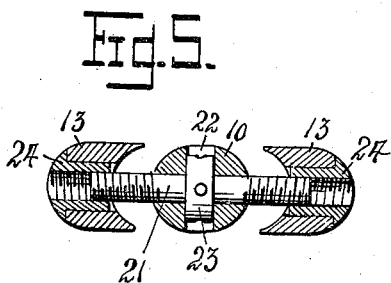
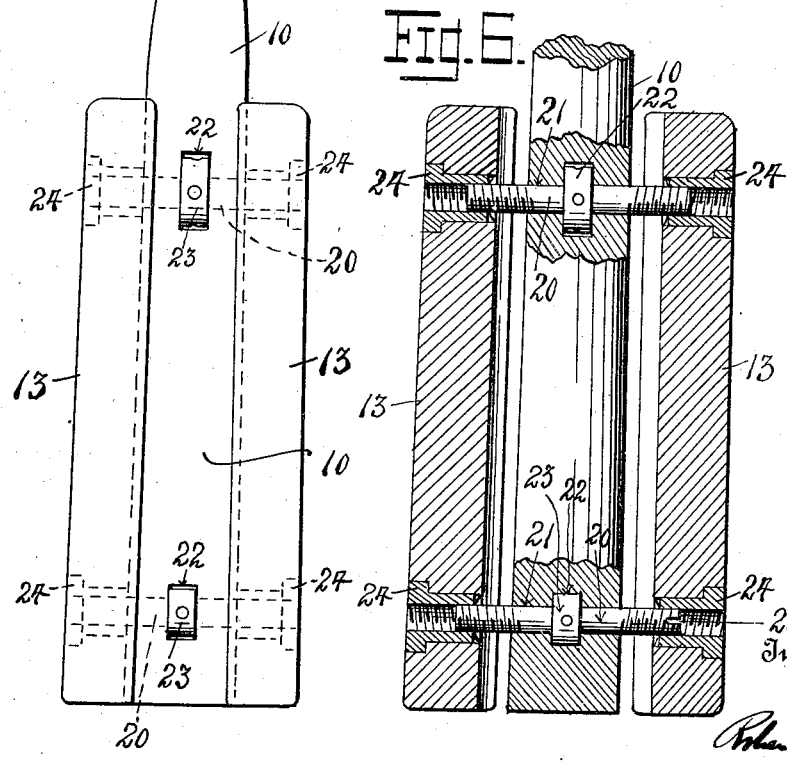

ROBERT D. MADDOX, OF WASHINGTON, DISTRICT OF COLUMBIA.

ADJUSTABLE TOOL-HANDLE.

1,296,416. Specification of Letters Patent. Patented Mar. 4, 1919.

Application filed October 19, 1918. Serial No. 258,872.

(FILED UNDER THE ACT OF MARCH 3, 1883, 22 STAT. L., 625.)

*To all whom it may concern:*

Be it known that I, ROBERT DANIEL MADDOX, major, Medical Corps, a citizen of the United States, stationed at Washington, D. C., have invented an Improvement in Adjustable Tool-Handles, of which the following is a specification.

The invention described herein may be used by the Government, or any of its officers or employees in prosecution of work for the Government, or by any other person in the United States, without payment of any royalty thereon.

This invention relates to the handles of implements of various kinds, more particularly to hammers, saws, planes and like implements or tools adapted to be grasped by the hand, and has for one of its objects to provide an attachment for devices of this character which may be adjusted to adapt the grip portion to the size of the hand of the user to increase the efficiency and reduce the fatigue.

Another object of the invention is to provide a grip attachment for an implement handle adapted to be adjusted to increase or decrease the size and to lock the same in adjusted position.

With these and other objects in view the invention consists in certain new and useful construction and combination of parts as will hereinafter be more fully described and pointed out in the claims.

For the purpose of illustration the improved attachment is shown applied to the handle of a hammer, and in the drawings—

Figure 1 is a side elevation of a hammer and its handle with the improved attachment applied.

Fig. 2 is a sectional elevation of the hand grip members and the portion of the handle associated therewith.

Fig. 3 is a transverse section on the line 3—3 of Fig. 2.

Figs. 4—5 and 6 are views similar to Figs. 1—2 and 3, illustrating modifications in construction.

The improved device may be applied to implement handles of various kinds, but is more particularly applicable to the handles of hammers, saws, planes and like implements, or tools, and it is not desired therefore to limit the invention to any specific tool or implement.

A conventional handle is represented as a whole at 10 and a hammer "head" at 11.

In the construction shown in Figs. 1, 2 and 3 the handle 10 is provided with transverse slots 12 in its grip portion, the slots being in parallel relation to the longitudinal axis of the head.

Disposed at opposite sides of the handles are grip members 13, the outer faces being rounded to conform to the outer faces of the handle and the inner faces concaved to engage over the adjacent faces of the handle, as denoted more clearly in Figs. 3 and 6.

In the embodiment of the invention disclosed in Figs. 1, 2 and 3 a plurality of coacting pairs of radius bars 14 are pivotally united at their outer ends at 15 to the grip members and extending into the slots 12 and pivoted together at their inner ends to pins 16 extending through the handle 10.

Embedded in the body of the handle opposite the slots are sleeves 17—18, the sleeves 18 being threaded to receive the threaded parts of the pins 16 at one side of the slots, while the sleeves 17 are unthreaded to rotatably receive the portions of the pins at the opposite sides of the slots.

The sleeves 17 are shorter than the sleeves 18 to provide space for the heads 19 of the pins, the latter each having a screw driver receiving recess, as shown.

By this arrangement, pressure can be applied to the overlapping inner ends of the radius bars, to lock them together and also to lock the grip members in adjusted position.

In the modification shown in Figs. 4, 5 and 6, right and left handed threaded rods 20 are substituted for the radius bars for effecting the adjustment of the grip members. In the modified structure the handle 10 is provided with apertures 21 through its longer transverse axis corresponding substantially to the location of the slots 12, and likewise provided with recesses 22 corresponding to the apertures 18 and communicating respectively with the apertures 21.

Each of the rods 21 is provided with a stop block 23 connected thereto and rotative within the recesses 22, so that the rods are free to be rotated in the handle but will not move longitudinally.

Each of the members 13 is provided with internally threaded sockets 24 to receive the threaded portions of the rods 21, as shown in Figs. 5 and 6, the threads of the sockets being right and left handed to correspond to the threads of the rods.

The rods 21 may be rotated by any suitable means: for instance by a pin wrench applied to suitable apertures in the blocks 24, or by a screw driver operating in a slot 25 in one end of each rod as shown in Fig. 5.

An implement handle equipped with the grip devices may be quickly adapted to the size of the hand of the person using the implement and firmly locked in adjusted position.

The operator can thus use the implement with greater efficiency and with less fatigue.

The improved attachment is especially adapted to persons having injured hands which prevent closing to the normal extent, as the grip members 13 can be adjusted to such hands and enable a person so afflicted to use the implement with the same facility as one having normal hands.

The members 13 may be of wood or metal as preferred, but will generally be of the same material as the body of the handle.

Having thus described the invention what is desired to secure by Letters Patent is:

1. The combination with an implement handle of oppositely disposed hand grip members, means for adjusting said grip members relative to the handle, and means for locking said grip members in adjusted position.

2. The combination with an implement handle, of a hand grip member movable laterally relatively to the handle, and means for holding said grip member in adjusted position.

3. An attachment of the class described comprising coacting grip members, means adapted to adjustably couple said grip members to an implement handle, and means for locking said grip members in adjusted position.

4. An implement handle having transverse slots, radius bars pivoted in said slots, hand grip members pivoted to said radius bars, and means for locking said radius bars in adjusted position.

5. An attachment of the class described comprising coacting hand grip members, radius bars pivoted to said hand grip members and adapted to be pivotally united to an implement handle, and means for locking said radius bars in adjusted position.

ROBERT D. MADDOX.

Copies of this patent may be obtained for five cents each, by addressing the "Commissioner of Patents, Washington, D. C."